(12) United States Patent
Yang

(10) Patent No.: US 10,367,742 B2
(45) Date of Patent: Jul. 30, 2019

(54) MULTI-SOLUTION BASED RADIO SYSTEM

(71) Applicant: Samsung Electronics Co., Ltd., Suwon-si (KR)

(72) Inventor: Ho Yang, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 362 days.

(21) Appl. No.: 14/518,467

(22) Filed: Oct. 20, 2014

(65) Prior Publication Data

US 2015/0156121 A1 Jun. 4, 2015

(30) Foreign Application Priority Data

Nov. 29, 2013 (KR) ........................ 10-2013-0147829

(51) Int. Cl.
*H04W 28/18* (2009.01)
*H04W 52/02* (2009.01)
*H04L 12/801* (2013.01)

(52) U.S. Cl.
CPC ............ *H04L 47/14* (2013.01); *H04W 28/18* (2013.01); *H04W 52/0229* (2013.01); *Y02D 70/142* (2018.01); *Y02D 70/164* (2018.01); *Y02D 70/26* (2018.01)

(58) Field of Classification Search
CPC .......... H04L 47/14; H04L 1/00; H04W 28/18; H04W 52/0229; Y02D 70/164; Y02D 70/142; Y02D 70/26
See application file for complete search history.

(56) References Cited

U.S. PATENT DOCUMENTS

| | | | | |
|---|---|---|---|---|
| 7,414,989 B2* | 8/2008 | Kuchibhotla | ......... | H04L 1/1671 370/329 |
| 7,756,150 B2* | 7/2010 | Yang | ..................... | H04W 88/06 370/420 |
| 8,194,558 B2* | 6/2012 | Choi | ..................... | H04L 1/0016 370/252 |
| 8,300,716 B1* | 10/2012 | Lee | ....................... | H04L 1/0003 370/241 |
| 8,553,526 B2* | 10/2013 | Meylan | ............... | H04L 12/2602 370/216 |
| 8,767,657 B1* | 7/2014 | Dehghan | ............. | H04L 27/2647 370/329 |
| 8,929,239 B2* | 1/2015 | Tabet | .................. | H04W 76/028 370/252 |
| 9,048,977 B2* | 6/2015 | Ramprashad | ......... | H04L 1/0003 |
| 9,112,648 B2* | 8/2015 | Moshfeghi | ............ | H04W 88/06 |
| 2004/0057456 A1* | 3/2004 | He | ..................... | H04L 12/5695 370/465 |

(Continued)

*Primary Examiner* — Christopher P Grey
(74) *Attorney, Agent, or Firm* — The Farrell Law Firm, P.C.

(57) ABSTRACT

A multi-solution based radio system is provided. A radio system adaptively selects a solution to be used in a communication method based on a quality of service (QoS). The radio system estimates a QoS, such as by using information about at least one of a channel state, a signal state, a performance using a current solution, a complexity using a current solution, and a power consumption of a terminal with respect to a current solution. When the estimated QoS does not satisfy a predetermined condition, the radio system changes a current solution to an alternative solution or changes a parameter value applied to the current solution using feedback information.

18 Claims, 8 Drawing Sheets

(56) References Cited

U.S. PATENT DOCUMENTS

| | | | | |
|---|---|---|---|---|
| 2005/0159166 A1* | 7/2005 | Jonsson | ............... | H04W 28/24 |
| | | | | 455/452.2 |
| 2006/0023745 A1* | 2/2006 | Koo | ................. | H04L 1/0002 |
| | | | | 370/468 |
| 2006/0209764 A1* | 9/2006 | Kim | ................. | H04B 7/0452 |
| | | | | 370/334 |
| 2011/0235542 A1* | 9/2011 | Li | ............................ | H04L 1/20 |
| | | | | 370/252 |
| 2011/0294456 A1* | 12/2011 | Anderson | ............ | H04W 28/18 |
| | | | | 455/404.1 |
| 2013/0021960 A1* | 1/2013 | Lee | .................. | H04W 52/0216 |
| | | | | 370/311 |
| 2013/0114482 A1* | 5/2013 | Oh | .................... | H04L 12/6418 |
| | | | | 370/310 |
| 2015/0009927 A1* | 1/2015 | Larsson | ............... | H04L 1/0007 |
| | | | | 370/329 |

\* cited by examiner

MULTI-SOLUTION BASED RADIO SYSTEM

CROSS-REFERENCE TO RELATED APPLICATIONS

This application claims the benefit under 35 USC 119(a) of Korean Patent Application No. 10-2013-0147829 filed on Nov. 29, 2013, in the Korean Intellectual Property Office, the entire disclosure of which is incorporated herein by reference for all purposes.

BACKGROUND

1. Field

The following description relates to a multi-solution based radio system. The following description also relates to a radio system that adaptively determines a solution to be executed based on a quality of service (QoS).

2. Description of Related Art

In general, a communication algorithm in a communication system may be designed to guarantee a minimum acceptable performance in consideration of affordability based on standardized specifications. Alternatively, a communication algorithm may be designed to have a maximum performance using available hardware resources. When the communication algorithm for the system is designed in consideration of affordability, supporting high-end solutions is difficult. Furthermore, a required performance may not be exhibited under inferior channel state conditions. However, when the communication system is designed to display a maximum performance within the capabilities of the provided hardware resources, management of resources may not be efficient.

In certain communication systems that use a multiple-input multiple-output (MIMO) method or a channel encoding method, a method of adaptively applying an algorithm based on a channel state, by defining a plurality of algorithms, may manage some of the issues discussed above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of controlling a radio system, the method including estimating a quality of service (QoS) with respect to a current solution of the radio system, determining whether the QoS satisfies a predetermined condition, and changing a parameter to be applied to the current solution or changing the current solution to an alternative solution in response to determining that the estimated QoS does not satisfy the predetermined condition.

The estimating may include estimating the QoS using information about at least one of a channel state, a signal state, a performance using the current solution, a complexity using the current solution, and a power consumption of a terminal with respect to the current solution.

The changing may include changing a parameter to be applied to the current solution or changing the current solution to an alternative solution using information about at least one of a channel state, a signal state, a performance using the current solution, a complexity using the current solution, and a power consumption of a terminal with respect to the current solution as feedback information in response to determining that the estimated QoS does not satisfy the predetermined condition.

The estimating, the determining, and the changing may be repeated until the QoS satisfies the predetermined condition.

The changing may include changing the current solution to a solution providing a QoS closest to the predetermined condition in response to determining that the estimated QoS does not satisfy the predetermined condition.

The method may further include repeatedly executing the current solution in response to determining that the estimated QoS satisfies the predetermined condition.

The solution may include an algorithm that processes information for the radio system in response to a request of a user or a combination of a plurality of such algorithms.

The information about the channel state and the information about the signal state may include at least one of a signal-to-noise ratio (SNR), channel state information (CSI), and a channel quality indicator (CQI).

The information about the performance using the current solution may include at least one of a bit error rate (BER), a packet error rate (PER), a frame error rate (FER), and a throughput.

In another general aspect, a non-transitory computer-readable storage medium includes a program for controlling a radio system, the program including instructions for causing a computer to perform the method presented above.

In another general aspect, a radio system includes a data processing unit configured to estimate a quality of service (QoS) with respect to a current solution of the radio system, and determine whether the estimated QoS satisfies a predetermined condition, and a controller configured to change a parameter to be applied to the current solution or to change the current solution to an alternative solution in response to determining that the estimated QoS does not satisfy the predetermined condition.

The data processing unit may be configured to transmit, as feedback information, information about a channel state, a signal state, a performance using the current solution, a complexity using the current solution, and a power consumption of a terminal with respect to the current solution in response to determining that the estimated QoS does not satisfy the predetermined condition.

The data processing unit may be configured to repeatedly transmit, to the controller as the feedback information, the information about the channel state, the signal state, the performance using the current solution, the complexity using the current solution, and the power consumption of the terminal with respect to the current solution until the QoS satisfies the predetermined condition.

The controller may be configured to change a parameter to be applied to the current solution or change the current solution to an alternative solution using the feedback information received from the data processing unit.

The controller may be configured to change the current solution to a solution providing a QoS closest to the predetermined condition in response to determining that the estimated QoS does not satisfy the predetermined condition.

The data processing unit may be configured to repeatedly execute the current solution in response to determining that the estimated QoS satisfies the predetermined condition.

The radio system may further include a multi-mode controller configured to control communication of a terminal based on a plurality of modes or a plurality of standards.

The multi-mode controller may be configured to change a mode of a terminal to a mode selected by a user or a mode determined based on a current communication state.

The radio system may include a plurality of controllers and a plurality of data processing units, and the multi-mode controller may be configured to operate in differing modes using the plurality of controllers and the plurality of data processing units.

The data processing unit may be configured to estimate the QoS using information about at least one of a channel state, a signal state, a performance using the current solution, a complexity using the current solution, and a power consumption of a terminal with respect to the current solution.

In another general aspect, a multi-mode radio system includes a radio system group including a plurality of sub-radio systems, wherein each sub-radio system includes a controller configured to estimate a quality of service (QoS) with respect to a current solution of the radio system, and to determine whether the estimated QoS satisfies a predetermined condition and a data processing unit to change a parameter to be applied to the current solution or to change the current solution to an alternative solution in response to determining that the estimated QoS does not satisfy the predetermined condition, and a multi-mode controller configured to control a standard or a mode of the sub-radio systems in the radio system group, wherein each of the sub-radio systems selects a solution according to a standard or mode determined for it by the multi-mode controller.

The data processing unit of each sub-radio system may be configured to repeatedly transmit, to the controller of the sub-radio system as the feedback information, the information about the channel state, the signal state, the performance using the current solution, the complexity using the current solution, and the power consumption of the terminal with respect to the current solution until the QoS satisfies the predetermined condition.

The controller of each sub-radio system may be configured to change a parameter to be applied to the current solution of the sub-radio system or change the current solution of the sub-radio system to an alternative solution using the feedback information received from the data processing unit.

Other features and aspects will be apparent from the following detailed description, the drawings, and the claims.

Figure 1:
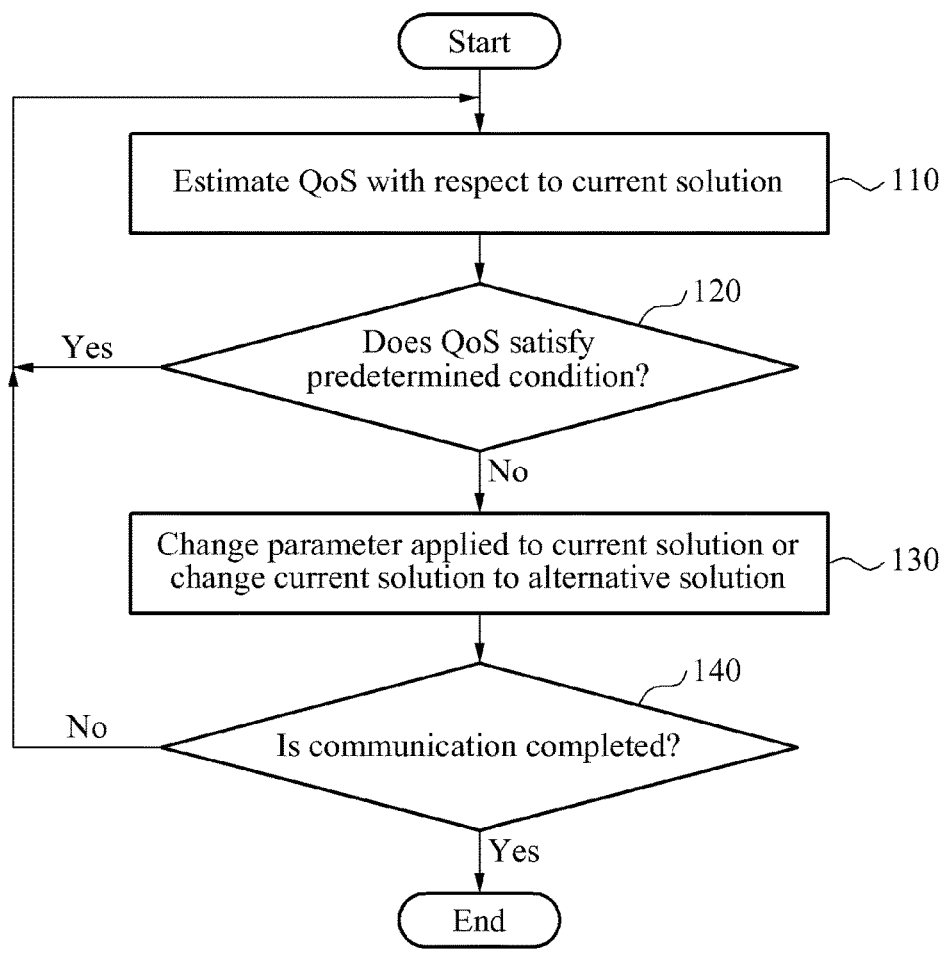
FIG. 1 is a flowchart illustrating an example of a method of controlling a radio system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a flowchart illustrating an example of a method of controlling a radio system.

For example, a radio system refers to a multi-solution based smart radio system that adaptively selects an optimal solution from among a plurality of solutions or algorithms. The radio system selects a solution satisfying a quality of service (QoS) required by a user from among a plurality of radio solutions associated with at least one mode or standard that the radio system is able to implement. As used herein, the standard refers to a broadcasting standard or a communication standard for radio communications. The mode refers to a broadcasting mode for the radio communications defined by the broadcasting standard or a communication mode defined by the communication standard.

The radio system uses, as feedback information, information about resource usage by a terminal. Such feedback information includes, for example, power consumption with respect to an algorithm currently being used. The feedback information allows the radio system to assist in managing the resources. The radio system measures power consumption in a currently used solution in real time. Based on the measurements, the radio system determines whether to modify the currently being used solution based on the measured power consumption. A user predicts an available period of time during which a current service is to be used, and selects a new solution for maintaining a selected service for a desired period of time by determining a solution to be applied to a terminal based on the power consumption with respect to the current solution.

For example, the radio system is disposed in a broadcasting terminal or a communication terminal, and changes a solution to be used for broadcasting or communication of such a terminal. Such an example radio system is applied to one or both of a transmitter and a receiver of the terminal.

A QoS refers to minimum service requirements to be guaranteed to a user engaged in communication. The QoS includes, for example, a communication quality, a computing power of a terminal, and a communication service time. In examples, the communication quality is determined based on a bit error rate (BER), a packet error rate (PER), and a throughput, the computing power of the terminal is determined based on a complexity of a solution to be applied, and the communication service time is determined based on power consumed by a solution.

An algorithm refers to a specific set of a limited number of rules and procedures clearly defined to solve a particular problem or to accomplish a task using a series of steps. A solution, being a method of resolving predetermined issues, refers to a technology, such as a hardware technology, that is configured to use an algorithm or a combination of algorithms to process pertinent information in response to a user request. The algorithm is a basic unit of a solution, and in various examples described herein, the term solution is interchangeably used with the term algorithm. Thus, a solution is a particular approach to processing information in a communication environment that corresponds to a least one algorithm that includes the steps used by the solution to accomplish the communications task that the solution relies upon. A multi-solution refers to a set including solutions for solving pertinent issues in a communications system in response to situations or user requests.

Algorithms with respect to a radio system have a hierarchical structure. For example, an overall algorithm is classified initially based on a broadcasting standard or a communication standard used by a terminal. After the initial classification, an algorithm is secondly classified based on broadcasting modes or communication modes included in the respective broadcasting standard or the communication standard. Thirdly, the algorithm is classified based on solutions included in the respective broadcasting modes or communication modes.

Hereinafter, the method of controlling the radio system is described.

Referring to FIG. 1, in 110, the method estimates a QoS with respect to a solution currently being executed. For example, a radio system estimates a QoS with respect to a solution currently being executed. The radio system estimates the QoS using information about at least one of a channel state, a signal state, a performance using a current solution, a complexity, and power consumption of a terminal with respect to a current solution. The radio system calculates the QoS using all or a portion of the information. In an example, the radio system calculates the QoS by applying a predetermined weight to each corresponding item of the information. Additionally, a preference or a priority of a user is optionally evaluated during a process of calculating the QoS. The information and the priority used for the estimating of the QoS is determined, for example, by a user or a system designer. Alternatively, various heuristics and techniques are used so that the system itself determines which information to use when determining the QoS.

The information about the channel state and the signal state includes, for example, a signal-to-noise ratio (SNR), channel state information (CSI), and a channel quality indicator (CQI). The information about the performance using the current solution includes, for example, a BER, a frame error rate (FER), a PER, and a throughput. The information about the complexity includes, for example, information represented in numbers, such as operations, instructions, and cycles. However, in certain examples, additional information is used in addition to or in lieu of the example specific types of information described here.

In 120, the method determines whether the estimated QoS satisfies a predetermined condition. For example, the radio system determines whether the estimated QoS satisfies a predetermined condition. The predetermined condition is determined by the user or the system designer, and is a constraint on the QoS that indicates expectations of the user or the system designer with respect to QoS during the communications process. For example, the predetermined condition refers to a QoS required by a user, for example, a target QoS. When the QoS satisfies the predetermined condition, the radio system continues to execute the solution currently being executed.

When the QoS is determined not to satisfy the predetermined condition, the method changes a parameter applied to the current solution, or changes the current solution to an alternative solution. For example, the radio system changes a parameter applied to the current solution, or changes the current solution to an alternative solution. In such an example, the radio system uses, as feedback information used for determining how to change a solution or a parameter in order to manage QoS, the information about at least one of the channel state, the signal state, the performance using the current solution, the complexity, and the power consumption of the terminal with respect to the current solution.

Thus, when the QoS based on the current solution does not satisfy the predetermined condition, the radio system changes the current solution to a solution providing a QoS that best satisfies the predetermined condition from among the available solutions. While it is possible that no available solution actually satisfies the predetermined constraint, in such a situation the radio system chooses an available solution that comes the closest.

In 140, the method continues to perform 110, 120, and 130 until communication of a terminal is completed. For example, the radio system continues to perform 110, 120, and 130 until communication of a terminal is completed. Estimating a QoS with respect to a solution being executed and determining whether the estimated QoS satisfies the predetermined condition is performed repeatedly, subsequent to the current solution or the parameter applied to the current solution being changed. For example, the solution or the parameter continuously changes in response to a change in at least one of a channel state, a signal state, a performance, a complexity, and a power consumption. By iterating through 110 through 140, an optimal solution for satisfying user requests is selected adaptively.

The radio system provides optimal service to a user by determining the optimal solution for satisfying the user requests from among a plurality of solutions, and enables an application of a terminal that comprehensively implements the plurality of broadcasting standards or the communication standards, and the plurality of modes defined in the respective broadcasting standards or the communication standards. For example, the radio system potentially achieves an integrated implementation of a multi-standard or a multi-mode without generation division among second generation (2G), third generation (3G) and fourth generation (4G) of a terminal and mode division from among a plurality of generational categories.

Figure 2:
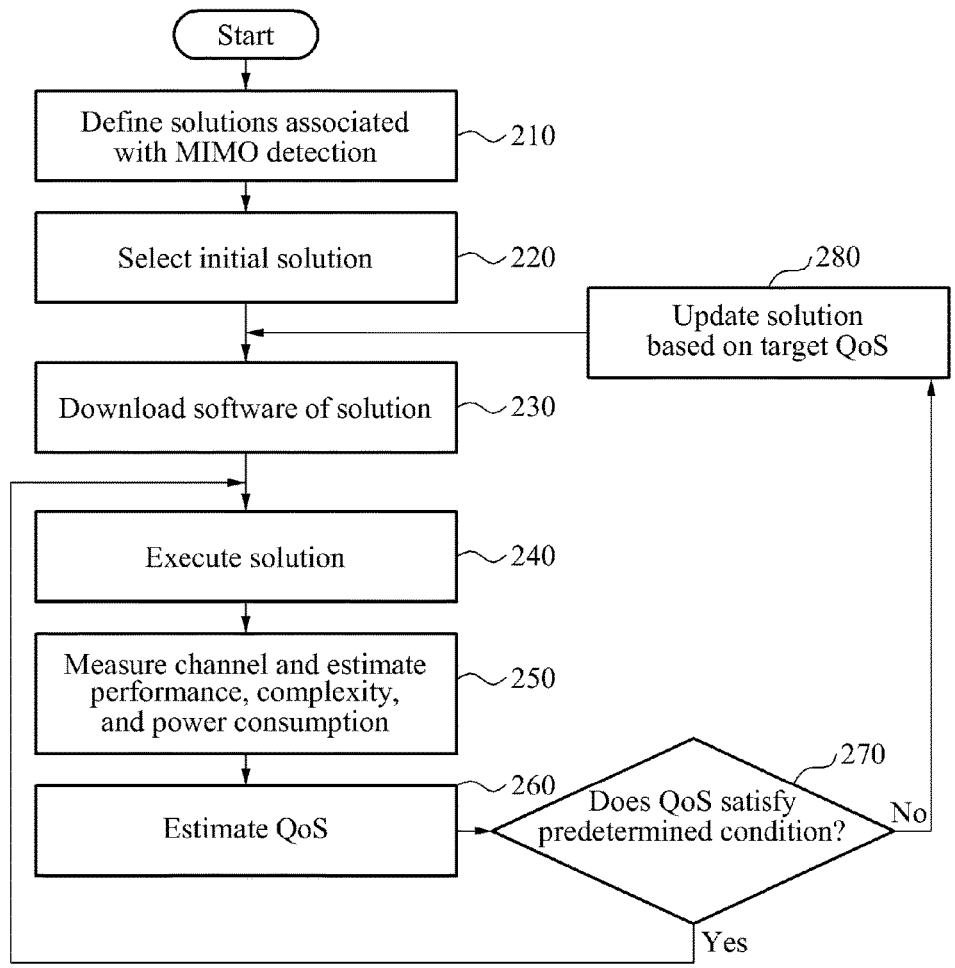
FIG. 2 is a flowchart illustrating an example of an operation of a radio system related to multiple-input multiple-output (MIMO) detection.

FIG. 2 is a flowchart illustrating an example of an operation of a radio system related to multiple-input multiple-output (MIMO) detection.

Referring to FIG. 2, in 210, the method defines solutions associated with MIMO detection. For example, the radio system defines solutions associated with MIMO detection. In such an example, the radio system defines the MIMO detection solutions, including examples such as, a K-best algorithm, a minimum mean square error (MMSE) algorithm, and a zero forcing (ZF) algorithm. Also, in such an example, information about the defined MIMO detection solutions is pre-stored, and the radio system loads and uses the information about the stored solutions as necessary.

In 220, the method selects an initial solution for an initial operation of a terminal. For example, the radio system selects an initial solution for an initial operation of a terminal. In such an example, the radio system selects the initial solution based on an SNR, a BER, and a complexity. As an example, when a low complexity condition is prioritized from among the MIMO detection solutions, the radio system selects the MMSE algorithm or the ZF algorithm rather than the K-best algorithm as the initial solution, because choosing an algorithm in such a manner helps to satisfy the low complexity condition. As another example, when a solution having a high performance BER and SNR is prioritized from among the MIMO detection solutions, the radio system selects the K-best algorithm rather than the MMSE algorithm and the ZF algorithm as the initial solution, because choosing an algorithm in such a manner helps to satisfy the high performance BER and SNR condition.

In 230, the method downloads software of the selected solution. For example, the radio system downloads software of the selected solution. In such an example, the radio system loads the software of the selected solution from a storage device, such as a memory.

In 240, the method executes the selected solution. For example, the radio system executes the selected solution. In such an example, the selected solution is downloaded to a program memory and executed.

In 250, the method measures a channel, and estimates a signal state, a performance using a current solution, and a power consumption of a terminal with respect to a current solution. For example, the radio system measures a channel, and estimates a signal state, a performance using a current solution, and a power consumption of a terminal with respect to a current solution.

In 260, the method radio system estimates a QoS using information about at least one of the channel, the performance using the current solution, the complexity, and the power consumption of the terminal with respect to the current solution measured in 240. For example, the radio system estimates a QoS using information about at least one of the channel, the performance using the current solution, the complexity, and the power consumption of the terminal with respect to the current solution measured in 240. In such an example, the radio system estimates the QoS using a total or a portion of the information.

In 270, the method determines whether the estimated QoS satisfies a predetermined condition. For example, the radio system determines whether the estimated QoS satisfies a predetermined condition. In such an example, when the QoS satisfies the predetermined condition, the radio system repeatedly executes a solution currently being executed.

When the QoS is determined not to satisfy the predetermined condition, the method updates a solution based on a target QoS representing the predetermined condition in 280. For example, the radio system updates a solution based on a target QoS representing the predetermined condition in 280. In such an example, the updating of the solution refers to changing a current solution to an alternative solution, or changing a parameter applied to the current solution. By making such changes, the radio system attempts to improve its functioning. The radio system uses, as feedback information used for updating a solution, information about at least one of a channel state, a signal state, a performance using a current solution, a complexity, and a power consumption of a terminal with respect to a current solution.

Thus, the radio system selects a solution determined to provide a QoS closest to a target QoS from among predefined solutions. The radio system selects the solution providing the QoS closest to the target QoS based on the information about the pre-stored solutions.

FIG. 2 will further be discussed with reference to Table 1. Table 1 illustrates an example of MIMO detection based on five solutions.

TABLE 1

| Channel (SNR) | Power (mW) | Perf. (BER) | Complexity (Mcps) | Solution: 5 Candidates |
|---|---|---|---|---|
| >30 dB (good) | <50 mW | <$10^{-5}$ | <100 Mcps | 4 × 4, 64 QAM, ZF (Hard) |
| >25 dB (normal) | <100 mW | <$10^{-5}$ | <100 Mcps | 4 × 4, 64 QAM, LR-SMMSE (Hard) |
| >25 dB (normal) | <50 mW | <$10^{-5}$ | <100 Mcps | 2 × 2, 64 QAM, LR-SMMSE (Hard) |
| >20 dB (bad) | <200 mW | <$10^{-5}$ | <100 Mcps | 4 × 4, 64 QAM, Soft LR-Kbest (K = 10) |
| >20 dB (bad) | <150 mW | <$10^{-5}$ | <100 Mcps | 2 × 2, 64 QAM, Soft LR-Kbest (K = 10) 4 × 4, 16 QAM, Soft LR-Kbest (K = 10) |
| >20 dB (bad) | <70 mW | <$10^{-5}$ | <100 Mcps | 2 × 2, 16 QAM, Soft LR-Kbest (K = 10) 4 × 4, 4 QAM, Soft LR-Kbest (K = 10) |

Table 1 illustrates a selection of an MIMO detection solution based on a channel state, a power consumption, a performance (Perf), and a complexity. As used herein, "Perf" is determined by a maximum BER value for communication, and the channel state is estimated from an SNR. The complexity is determined by a maximum cycle, for example, an operational frequency of a system, permitted for MIMO detection in an entire system. The complexity and the power consumption are proportional to each other, and thus only one of the complexity and the power consumption is determined as a condition. "Perf" is also able to be determined by a PER and an FER in lieu of the BER. The solutions indicated in Table 1 potentially change to other solutions using an alternative algorithm, or a number of selectable solutions vary based on a permitted level of complexity. In Table 1, "cps" denotes cycles per second.

For example, the radio system is assumed to select "4×4, 64QAM, Soft LR-Kbest (K=10)" as a solution representing a greatest BER performance and a greatest processing amount, as an initial solution. The radio system estimates a QoS in "4×4, 64QAM, Soft LR-Kbest (K=10)", and determines whether the estimated QoS satisfies a predetermined condition, such as in response to a request from a user or a system designer. When the QoS does not satisfy the predetermined condition, the radio system selects an alternative solution satisfying the QoS, or changes a parameter value. When a lower power consumption made the priority in the condition to be satisfied by the QoS, the radio system selects "2×2, 64QAM, LR-SMMSE (Hard)", for example, as being solution having a low power consumption despite an intermediate performance and an intermediate processing amount. The radio system performs communication based on the selected solution.

Figure 3:
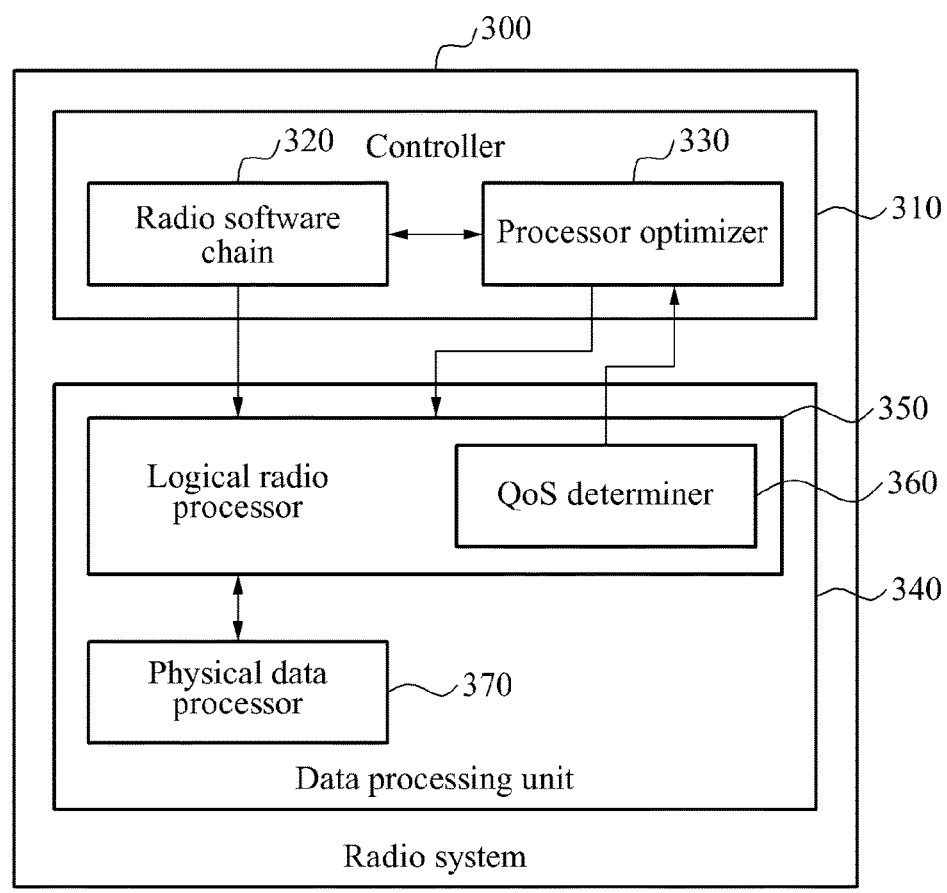
FIG. 3 is a diagram illustrating an example of a configuration of a radio system.

FIG. 3 is a diagram illustrating an example of a configuration of a radio system 300.

Referring to FIG. 3, the radio system 300 estimates a performance of a solution currently being executed, a complexity of the current solution, and a power consumption based on a channel value and a data reception result estimated in a terminal. For example, the terminal is a broadcasting terminal or a communication terminal. In FIG. 3, the radio system 300 selects a solution to be used based on a channel state determined by an SNR, a processing amount, a BER, a complexity, and a power consumption.

The radio system 300 selects a solution for enhancing a QoS based on the performance of the current solution, the complexity, and the power consumption, and applies the selected solution to the terminal. The radio system 300 selects an optimal solution from among a plurality of solutions causing performance differences in order to configure and operate the radio system 300.

The radio system 300 stores program software or control information about solutions defined by variables, for example, a predetermined channel condition, a predetermined signal condition, a solution performance, a complexity, and a power consumption, and refers to a corresponding item included in the information, as necessary.

In an example, the radio system 300 implements solutions based on various algorithms, and stores results of the implementations. The radio system 300 selects appropriate algorithms based on a channel state, a solution performance, and a terminal state, and operates, in a processor, the algorithms selected by changing a predetermined code disposed in a program memory.

As shown in FIG. 3, the radio system 300 includes a controller 310 and a data processing unit 340. The data processing unit 340 estimates a QoS with respect to a current solution, and determines whether the estimated QoS satisfies a predetermined condition. When the estimated QoS does not satisfy the predetermined condition, the controller 310 changes a parameter to be applied to the current solution, or changes the current solution to an alternative solution. As discussed above, by making these changes, the radio system 300 changes how it operates so as to improve its ability to satisfy the predetermined condition for the QoS.

The controller 310 controls a selection of a solution or an algorithm to be applied to a reception method by a terminal. The controller 310 includes a radio software chain 320 and a processor optimizer 330.

The radio software chain 320 defines a solution in a form of a partial chain or a full chain, to which a plurality of algorithms is applied. The radio software chain 320 provides a predetermined solution to the data processing unit 340 based on information about a solution designed in a form of a full chain or a partial chain, configuring a multi-solution approach. The predetermined solution is selected based on a channel condition and a required performance, by choosing a solution that best satisfies the performance requirements, given the channel condition requirements. The radio software chain 320 determines a configuration and a connection of the data processing unit 340 based on a pre-designed solution. The radio software chain 320 defines a solution based on a target performance indicated by a BER, an FER, and a throughput and a channel condition.

The processor optimizer 330 determines a solution or calculates a parameter, to enhance a QoS based on data received from a logical radio processor 350. When the QoS does not satisfy the predetermined condition, a QoS determiner 360 transmits, to the processor optimizer 330 as feedback information, information used for estimating the QoS. The processor optimizer 330 determines a solution or a parameter based on the feedback information received from the QoS determiner 360. The feedback information includes, for example, a channel state, a signal state, a performance using a current solution, a complexity, and a power consumption measured in a terminal.

The processor optimizer 330 optimizes a pre-defined solution based on the feedback information. The processor optimizer 330 uses all or a portion of information about a channel state, a signal state, a performance using a current solution, a complexity, and a power consumption included in the feedback information for optimizing the solution. The processor optimizer 330 selects a solution for satisfying a required target QoS, or selects a solution for providing a QoS closest to the target QoS from among available pre-defined solutions.

The processor optimizer 330 determines whether to change a parameter included in a current solution or determines whether to change the current solution to a pre-defined alternative solution, based on the feedback information. The processor optimizer 330 changes the current solution or the parameter based on the feedback information and the available pre-defined solutions.

The processor optimizer 330 controls the data processing unit 340 based on the optimized solution information. The processor optimizer 330 controls a structure of the data processing unit 340 and updates a parameter to satisfy a predetermined QoS required. When information about the current solution is updated, the processor optimizer 330 reflects the updated solution information in the logical radio processor 350. The logical radio processor 350 changes a configuration and a connection of a physical data processor 370 based on the updated solution information.

The controller 310 determines a mode to be applied to the radio system 300. The controller 310 changes a mode of the radio system 300 with respect to the mode. In an example, the controller 310 changes its mode by loading information about the mode from a storage unit (not shown) into its memory.

The data processing unit 340 performs a control operation instructed by the controller 310, and executes the solution determined by the controller 310. The data processing unit 340 processes data by changing its configuration based on the solution determined by the controller 310 or a pertinent parameter.

When the current solution changes to an alternative solution, the changed solution includes at least one algorithm chain that performs data processing. Information related to the changed solution is stored externally to a program memory and downloaded to the program memory to be executed.

When the parameter applied to the current solution changes, the parameter changes without a change in a program currently being operated. The parameter changes by loading information required for the parameter change into the memory appropriately so that the value of the memory that previously stored the parameter is written over with the new parameter value.

In an example, a solution is implemented, in the data processing unit 340, through a combination of by function units (FUs). The FUs include various hardware configured in various ways, and are also configured to implement algorithms as discussed above in order to implement the solutions.

The data processing unit 340 performs a data operation of a full chain or a partial chain defined in the radio software chain 320 of the controller 310. For example, the data processing unit 340 includes a single application-specific integrated circuit (ASIC) hardware or a combination of the ASIC hardware.

The data processing unit 340 includes the logical radio processor 350 and the physical data processor 370. The logical radio processor 350 includes the QoS determiner 360.

The logical radio processor 350 controls the physical data processor 370, and calculates values associated with a complexity, a power consumption with respect to a current solution, and a performance of the radio system 300. A main function of a solution of a full chain or a partial chain selected by the radio software chain 320 operates in the logical radio processor 350. The logical radio processor 350 defines a structure of the physical data processor 370 that processes data, and instructs the physical data processor 370 with respect to an operation to be performed.

The QoS determiner 360 measures information about a channel state, a signal state, a performance using a current solution, a complexity, and a power consumption with respect to a current solution. The information about the channel state and the signal state includes an SNR, CSI, and a CQI, as discussed above. The information about the performance using the current solution includes information about a BER, an FER, a PER, and a throughput, as discussed above. The information about the complexity includes information represented in numbers, for example, operations, instructions, and cycles, as discussed above. A load of a processor resulting from a current solution being executed is estimated by a complexity or a power consumption, for example.

The QoS determiner 360 estimates the SNR and CSI based on a received signal and a channel state. The radio system 300 estimates the BER, PER, and the throughput by performing a cyclic redundancy check (CRC). The QoS determiner 360 estimates the complexity and the power consumption in non-real time, using register transfer level (RTL) simulation or gate-level simulation. Alternatively, the QoS determiner 360 estimates the power consumption in real time using a hardware performance counter.

The QoS determiner 360 estimates a QoS with respect to a current solution based on information about a channel state, a signal state, a performance using a current solution, a complexity, and a power consumption with respect to a current solution. The QoS determiner 360 determines whether the estimated QoS satisfies a predetermined condition, or a target level. The predetermined condition, for example, a criterion determining whether the QoS satisfies the target level, is determined through being selected by a system designer or a user. However, other predetermined conditions may be used in other examples. For example, rather than having the criterion being a threshold level for the QoS, in another criterion is a target range in which the QoS is to fall.

When the QoS does not satisfy the predetermined condition, the QoS determiner 360 requests that the controller 310 is to change the current solution or a parameter. Furthermore, when the QoS does not satisfy the predetermined condition, the QoS determiner 360 transmits, to the processing optimizer 330 as feedback information, values associated with a channel state, a signal state, a performance using a current solution, a complexity, and a power consumption with respect to a current solution. For example, the QoS determiner 360 sends feedback information used to determine the QoS to the processor optimizer 330.

The QoS determiner 360 generates feedback information periodically, and determines whether to transmit the generated feedback information to the processor optimizer 330. When the currently calculated QoS does not satisfy the predetermined condition, the QoS determiner 360 determines to transmit the feedback information to the processor optimizer 330.

As another example, the QoS determiner 360 continuously transmits the feedback information to the processor optimizer 330, irrespective of whether the QoS satisfies the predetermined condition. The processor optimizer 330 determines a current QoS state based on the feedback information, and changes the current solution to an alternative solution or changes the parameter applied to the current solution based on the current QoS state.

The QoS determiner 360 estimates a current QoS level. When the estimated QoS level does not satisfy the predetermined condition, the QoS determiner 360 sends feedback of pertinent information, to the processor optimizer 330. Accordingly, the changing, performed by the processor optimizer 330, of the solution or the parameter is continuously performed until the QoS level satisfies the predetermined condition.

For example, first the QoS determiner 360 calculates a current QoS level based on the SNR and BER. Second, the QoS determiner 360 determines whether the calculated QoS level satisfies a predetermined condition. Third, when the QoS level is does not satisfy the predetermined condition, the QoS determiner 360 transmits feedback information to the processor optimizer 330. Fourth, the processor optimizer 330 changes a communication algorithm and a parameter to be applied to a terminal based on the feedback information received from the QoS determiner 360. Fifth, the controller 310 maps the changed communication algorithm and the parameter to a digital signal processor (DSP), and applies the changed communication algorithm and/or the parameter to the terminal. The radio system 300 continuously performs the above five operations until the QoS level satisfies the predetermined condition.

The physical data processor 370 connects a data path and performs a data operation, by being controlled by the logical radio processor 350. The physical data processor 370 includes a data processing unit. For example, the data processing unit is provided in a form of an ASIC or a DSP/application-specific instruction-set processor (ASIP). The physical data processor 370 includes, for example, a single data processing unit or a combination of a plurality of data processing units.

Figure 4:
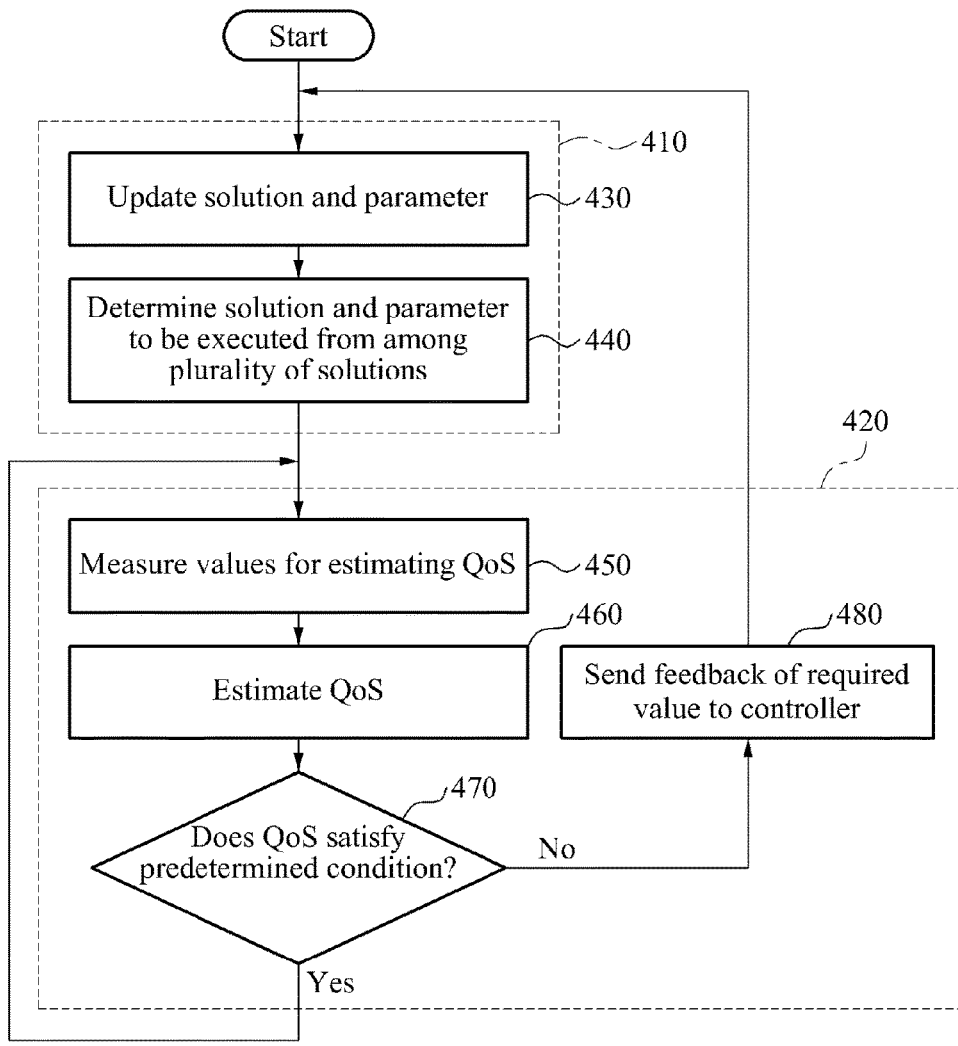
FIG. 4 is a flowchart illustrating an example of an operation of a radio system.

FIG. 4 is a flowchart illustrating an example of an operation of a radio system, in which an operation performed by a controller 410 and an operation performed by a data processing unit 420 are illustrated.

In 430, the method updates a solution and a parameter based on a required QoS value. For example, the controller 410 updates a solution and a parameter based on a required QoS value. In an initial state of the radio system, 430 is optional. In 440, the method determines a solution and a parameter to be executed from among a plurality of predetermined solutions. For example, the controller 410 determines a solution and a parameter to be executed from among a plurality of predetermined solutions. In the initial state of the radio system, a solution displaying a greatest performance from among the predetermined solutions, based upon criteria discussed above, is determined to be the solution to be executed.

In 450, the method measures values for estimating a QoS. For example, the data processing unit 420 measures values for estimating a QoS. In such an example, the data processing unit 420 measures a channel state, a signal state, a performance using a current solution, a complexity, and a power consumption of a terminal with respect to a current solution.

In 460, the method estimates a QoS with respect to a current solution using the values measured in 450. For example, the data processing unit 420 estimates a QoS with respect to a current solution using the values measured in 450. In such an example, the data processing unit 420 calculates the QoS using a total or a portion of the values measured in 450, and calculates the QoS by applying a predetermined weight to each corresponding item of information. A user preference or a priority is evaluated during this process of calculating the QoS.

In 470, the method determines whether the estimated QoS satisfies a predetermined condition. For example, the data processing unit 420 determines whether the estimated QoS satisfies a predetermined condition. In such an example, when the QoS satisfies the predetermined condition, the data processing unit 420 continuously performs a current solution. Additionally, when the QoS satisfies the predetermined condition, the data processing unit 420 periodically estimates the QoS using the values for estimating the QoS, and continuously performs the determining of whether the QoS satisfies the predetermined condition.

When the QoS does not satisfy the predetermined condition, in 480 the method sends feedback of a value required for updating a solution and a parameter to the controller 410. For example, the data processing unit 420 sends feedback of a value required for updating a solution and a parameter to the controller 410 in 480. In such an example, the data processing unit 420 sends feedback on information about an SNR, a BER, and a complexity to the controller 410.

The controller 410 changes, through the feedback, the current solution to an alternative solution or the parameter applied to the current solution using the values received from the data processing unit 420. To perform such changing, the controller 410 selects a solution determined to provide a QoS closest to a target QoS from among predetermined solutions using the values received from the data processing unit 420. The controller 410 updates the current solution based on the selected solution, thereby changing the solution as discussed.

Figure 5:
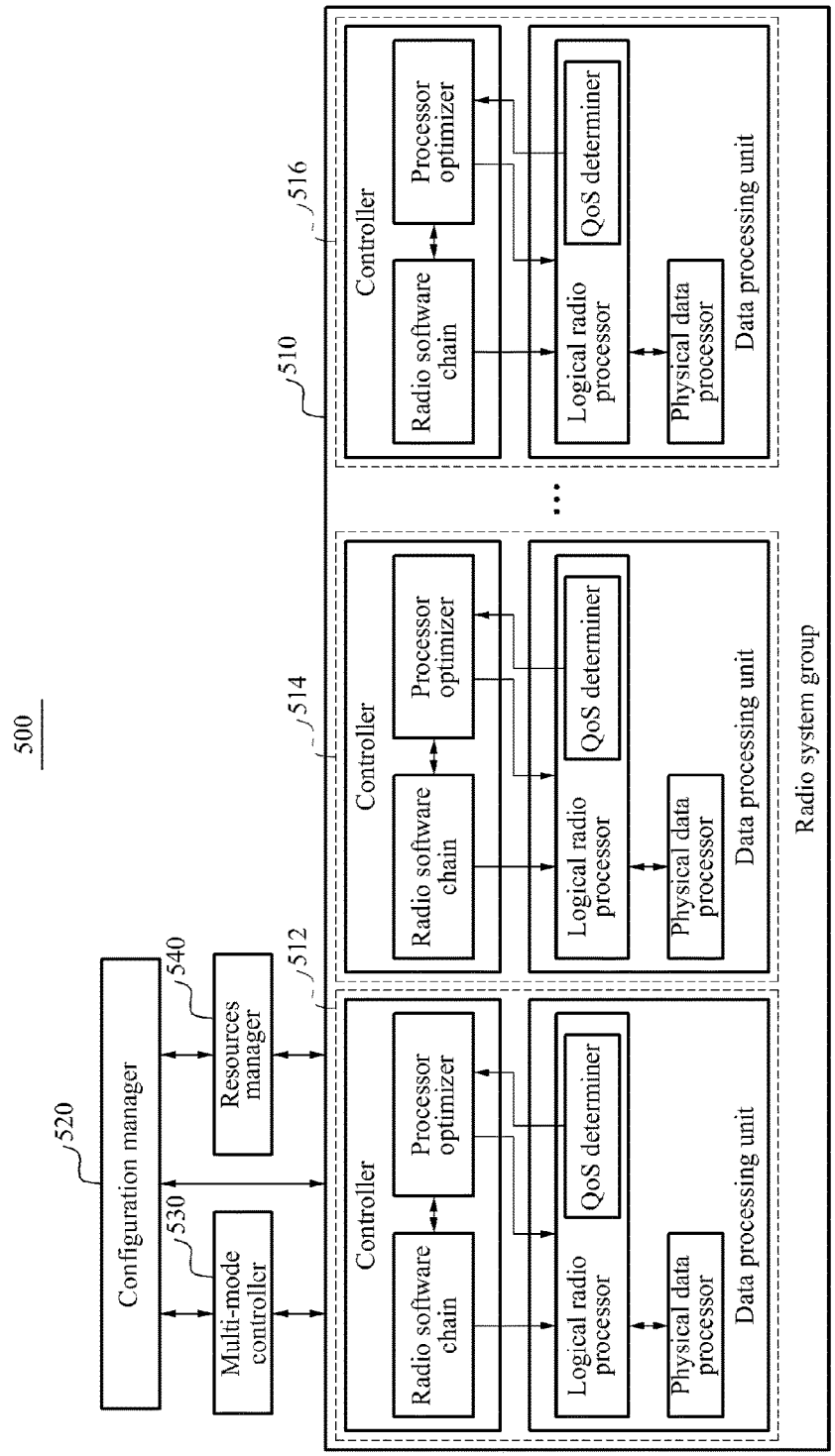
FIG. 5 is a diagram illustrating an example of a radio system extended to a multi-mode operation.
Figure 6:
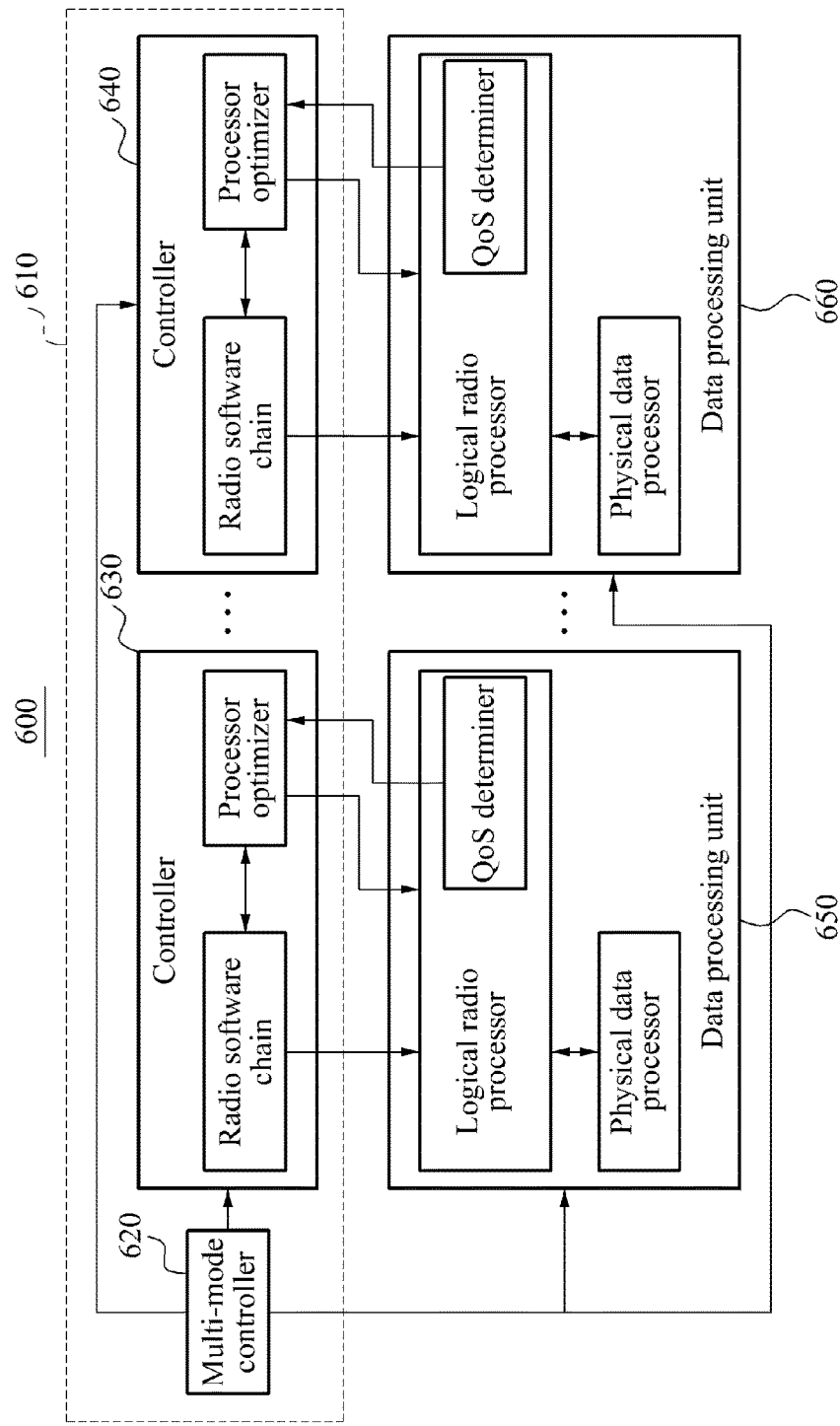
FIG. 6 is a diagram illustrating another example of a radio system extended to a multi-mode operation.

FIGS. 5 and 6 are diagrams illustrating examples of a structure in which a multi-mode controller for controlling various modes is combined with a radio system. For example, the radio system is extended to a multi-mode operation or a multi-standard operation. In such an example, the radio system adaptively determines a solution to be used based on various broadcasting or communication standards, and modes defined by the respective broadcasting standards or communication standards.

In an example of a multi-mode radio system, at least one radio system is extended. In such an example, the multi-mode radio system is configured based on a user preference or a priority in defining a QoS. A selection of at least one standard or mode is performed sequentially or simultaneously. The selection of at least one standard or mode is performed by a user or automatically performed by the radio system.

The radio system selects an optimal standard or an optimal mode for providing an optimal service to the user. The radio system selects a standard or a mode to be used based on information about a channel state, a signal reception state, a performance of a solution currently being executed, and resource consumption and user preference or priority information. Criteria related to such information allows the radio system to determine which standard or mode is optimal. For example, the priority information is determined based on imminence or significance of a broadcasting receiver, a wireless local area network (WLAN), and a communication modem based on applications, for example, a voice call, data communication, multimedia communication, and TV viewing, and data processing amount requirements.

The user preference information includes information about a power consumption and a data transmission/reception performance. For example, the radio system determines a standard or a mode of operation at least partially based on preference information about at least one of minimizing a power consumption and maximizing a data transmission/reception performance.

FIG. 5 is a diagram illustrating an example of a radio system extended to a multi-mode operation, also referred to as a multi-mode radio system 500. The multi-mode radio system 500 operates by using a plurality of modes simultaneously. The multi-mode radio system 500 includes a radio system group 510 for operating using a plurality of modes, a multi-mode controller 530 for controlling a standard or a mode of operation of the radio system group 510, a resources manager 540 for managing resources, and a configuration manager 520 for controlling an overall operation of the radio system group 510. The radio system group 510 includes a plurality of sub-radio systems 512, 514, and 516 for selecting a solution with respect to a single mode of operation. Each operation and structure of the sub-radio systems 512, 514, and 516 corresponds to appropriate descriptions as per the radio system 300 illustrated in FIG. 3.

FIG. 6 is a diagram illustrating another example of a radio system extended to a multi-mode operation, also referred to as a multi-mode radio system 600. The multi-mode radio system 600 includes a multi-mode controller 620 for controlling a plurality of radio systems. The multi-mode controller 620 controls a standard or a mode of operation of a radio system. The multi-mode controller 620 changes a mode of a terminal to a mode selected by a user or a mode determined based on a current communication state. A multi-mode management unit 610 of the multi-mode radio system 600 includes the multi-mode controller 620, a first controller 630, and a second controller 640. The multi-mode controller 620 directly controls a first data processing unit 650 connected to the first controller 630 and a second data processing unit 660 connected to the second controller 640. The operation of the first controller 630 and the operation of the second controller 640 correspond to descriptions related to the controller 310 as illustrated in FIG. 3, and an operation of the first data processing unit 650 and an operation of the second data processing unit 660 correspond to descriptions related to the data processing unit 340 as illustrated in FIG. 3.

Figure 7:
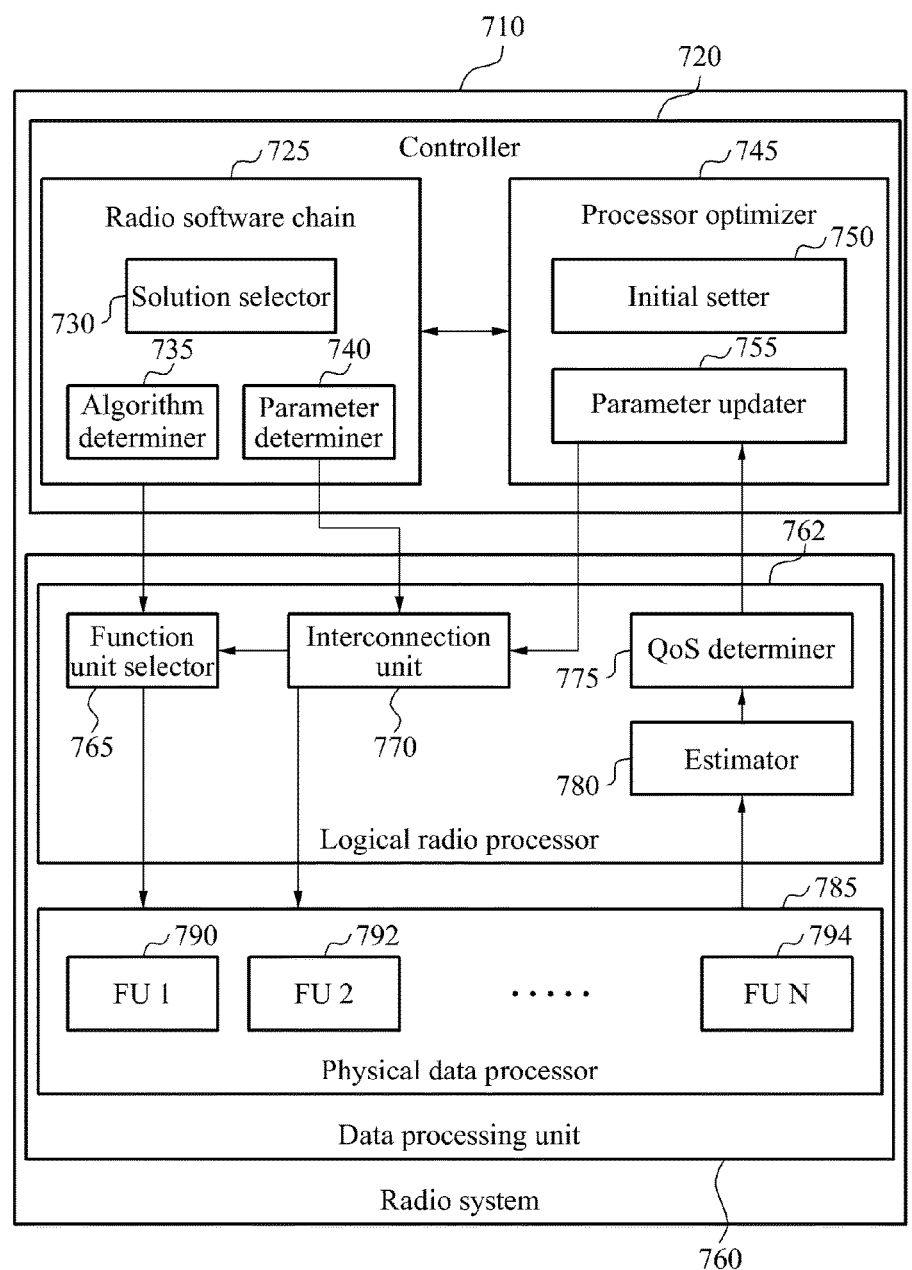
FIG. 7 is a diagram illustrating another example of a configuration of a radio system.

FIG. 7 is a diagram illustrating another example of a configuration of a radio system 710.

The radio system 710 of FIG. 7 is a further example of the radio system 300 of FIG. 3. FIG. 7 illustrates various components of the components of the radio system 300 of FIG. 3 to provide an example include additional information about how the radio system 300 may be structured. The radio system 710 includes a controller 720 and a data processing unit 760.

The controller 720 includes a radio software chain 725 and a processor optimizer 745. The radio software chain 725 includes a solution selector 730 for selecting a solution to be applied to a terminal, an algorithm determiner 735 for determining an algorithm based on a selected solution, and a parameter determiner 740 for determining a parameter based on a selected solution. The processor optimizer 745 includes an initial setter 750 for setting an algorithm and a parameter to be applied to a terminal in an initial state and a parameter updater 755 for updating a parameter applied to a current solution based on feedback information transmitted by a QoS determiner 775.

The data processing unit 760 includes a logical radio processor 762 and a physical data processor 785. The logical radio processor 762 includes an estimator 780 for estimating a channel state, a signal state, a performance using a current solution, a complexity, and a power consumption, the QoS determiner 775 for determining a QoS with respect to a current solution based on a result of the estimating of the estimator 780, a function unit selector 765 for controlling FUs of the physical data processor 785, and an interconnection unit 770 for controlling a connection of FUs. In an example, the physical data processor 785 is provided as a processor in a form of a DSP or an ASIP configured by a plurality of FUs 790, 792, and 794. In another example, the physical data processor 785 is re-configured by the logical radio processor 762.

Figure 8:
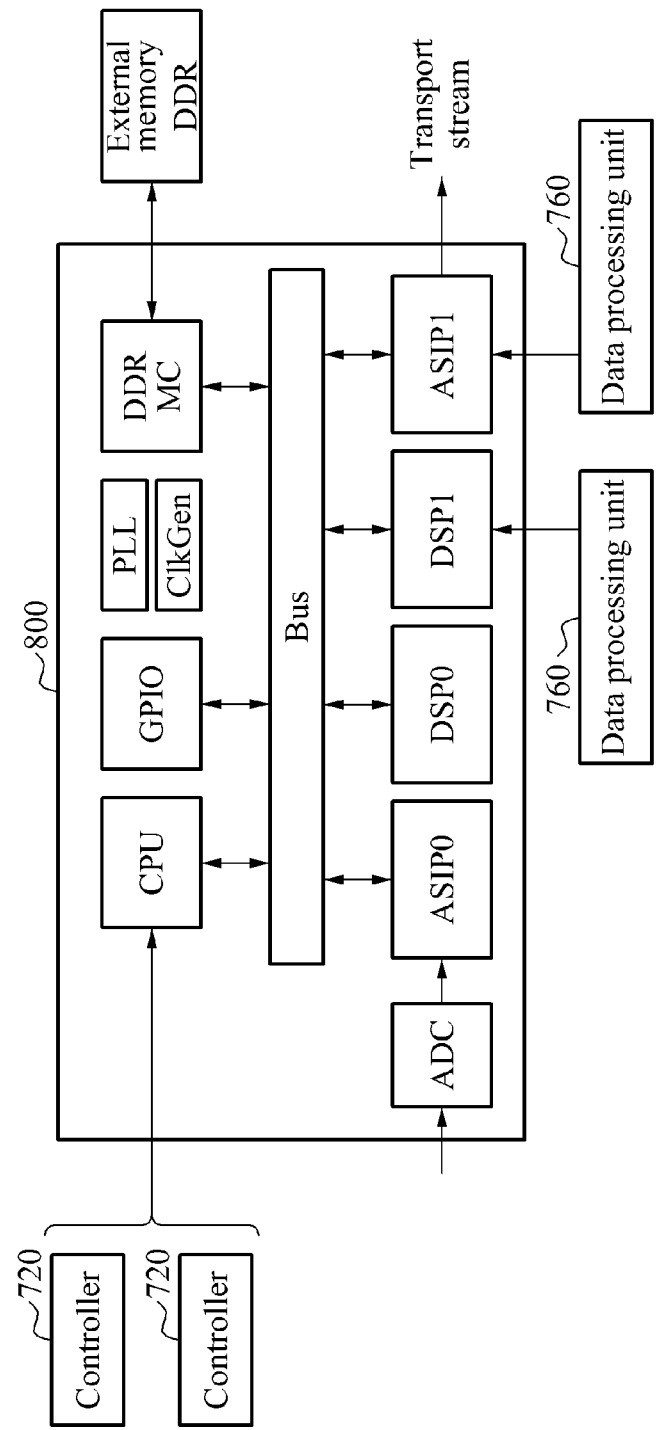
FIG. 8 is a diagram illustrating an example of a super system of a broadcasting receiver.

FIG. 8 is a diagram illustrating an example of a super system 800 of a broadcasting receiver.

An example of a radio system as discussed herein being applied to the super system 800 of a conventional broadcasting receiver is illustrated in FIG. 8. For example, the super system 800 refers to a broadcasting receiver based on a DSP/ASIP. The controller 720 and the data processing unit 760 of the radio system are separate from each other, and mapped to a system block of the super system 800. An example in which a soft demapper and a low-density parity-check (LDPC) decoder are divided and mapped to a DSP1 and an ASIP1, respectively, and a solution for a plurality of functions is selected and processed in an additional radio system is illustrated in FIG. 8.

The controller 720 of the radio system is implemented, for example, in a form of a module in a central processing unit (CPU). The data processing unit 760 of the radio system is implemented, for example, in a DSP or an ASIP. In an example, the radio system is implemented with respect to a full chain or a partial chain, and an example in which the radio system is applied to a predetermined function, for example, a partial chain, is illustrated in FIG. 8.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling a radio system, the method comprising:
   estimating a quality of service (QoS) with respect to a current solution of the radio system, using information about a channel state, a signal state, a performance when using the current solution, and a complexity measuring processing burden when using the current solution and a power consumption of a terminal with respect to the current solution;
   determining whether the QoS satisfies a condition; and
   changing a parameter to be applied to the current solution or changing the current solution to an alternative solution in response to determining that the estimated QoS does not satisfy the condition, by changing a parameter to be applied to the current solution or changing the current solution to an alternative solution using updated information about the channel state, the signal state, the performance when using the current solution, and the complexity measuring processing burden when using the current solution and the power consumption of a terminal with respect to the current solution, as feedback information,
   wherein the parameter is changed to provide a QoS that is closest to the condition from available changes of the parameter, or the current solution is changed to the alternative solution to provide a QoS that is closest to the condition from available changes of the current solution,
   wherein the channel state indicates an information about error and the performance is determined by a maximum cycle or an operation frequency of the radio system permitted for MIMO detection.

2. The method of claim 1, wherein the estimating, the determining, and the changing are repeated until the QoS satisfies the condition.

3. The method of claim 1, further comprising:
   repeatedly executing the current solution in response to determining that the estimated QoS satisfies the condition.

4. The method of claim 1, wherein the current solution comprises an algorithm that processes information for the radio system in response to a request of a user or a combination of such algorithms.

5. The method of claim 1, wherein the information about the channel state and the information about the signal state comprises any one or any combination of any two or more of:
   a signal-to-noise ratio (SNR), channel state information (CSI), and a channel quality indicator (CQI), and wherein the information about the performance when using the current solution comprises any one or any combination of any two or more of:
   a bit error rate (BER), a packet error rate (PER), a frame error rate (FER), and a throughput.

6. A non-transitory computer-readable storage medium storing instructions that, when executed by a processor, cause the processor to perform the method of claim 1.

7. The method of claim 1, wherein the condition is based on user preference or priority information with respect to the information about the channel state, the signal state, the performance when using the current solution, and the complexity measuring processing burden when using the current solution and the power consumption of the terminal with respect to the current solution.

8. The method of claim 7, wherein the user preference or priority information comprises weights with respect to the channel state, the signal state, the performance when using the current solution, and the complexity measuring processing burden when using the current solution and the power consumption of the terminal with respect to the current solution.

9. A radio system, comprising:
   a data processor configured to estimate a quality of service (QoS) with respect to a current solution of the radio system using information about a channel state, a signal state, a performance when using the current solution, and a complexity measuring processing burden when using the current solution and a power consumption of a terminal with respect to the current solution, and determine whether the estimated QoS satisfies a condition and to transmit, as feedback information, updated information about the channel state, the signal state, the performance when using the current solution, and the complexity measuring processing burden when using the current solution and the power consumption of a terminal with respect to the current solution, in response to determining that the estimated QoS does not satisfy the condition; and
   a controller configured to change a parameter to be applied to the current solution or to change the current solution to an alternative solution in response to the determining that the estimated QoS does not satisfy the condition, using the feedback information, wherein
   the controller is configured to change the parameter to provide a QoS that is closest to the condition from available changes of the parameter or to change the current solution to the alternative solution to provide a QoS that is closest to the condition from available changes of the current solution,
   wherein the channel state indicates an information about error and the performance is determined by a maximum cycle or an operation frequency of the radio system permitted for MIMO detection.

10. The radio system of claim 9, wherein the data processor is configured to repeatedly transmit, to the controller as the feedback information, the information about the channel state, the signal state, the performance when using the current solution, and the complexity measuring processing burden when using the current solution and the power consumption of the terminal with respect to the current solution until the QoS satisfies the condition.

11. The radio system of claim 9, further comprising:
   a multi-mode controller configured to control communication of a terminal based on modes or standards.

12. The radio system of claim 11, wherein the radio system comprises controllers and data processors, and the multi-mode controller is configured to operate in differing modes using the controllers and the data processors.

13. The radio system of claim 11, wherein the multi-mode controller is configured to change a mode of a terminal to a mode selected by a user or a mode determined based on a current communication state.

14. The radio system of claim 9, wherein the condition is based on user preference or priority information with respect to the information about the channel state, the signal state, the performance when using the current solution, and the complexity measuring processing burden when using the current solution and the power consumption of the terminal with respect to the current solution.

15. The radio system of claim 14, wherein the user preference or priority information comprises weights with respect to the channel state, the signal state, the performance when using the current solution, and the complexity measuring processing burden when using the current solution and the power consumption of the terminal with respect to the current solution.

16. A multi-mode radio system, comprising:
a radio system group comprising sub-radio systems, wherein each sub-radio system comprises a data processor configured to estimate a quality of service (QoS) with respect to a current solution of the radio system using information about a channel state, a signal state, a performance when using the current solution, and a complexity measuring processing burden when using the current solution and a power consumption of the terminal with respect to the current solution, and to determine whether the estimated QoS satisfies a condition and a controller configured to change a parameter to be applied to the current solution or to change the current solution to an alternative solution in response to determining that the estimated QoS does not satisfy the condition, wherein the data processor of each sub-radio system is configured to repeatedly transmit, to the controller of the sub-radio system, as feedback information, updated information about the channel state, the signal state, the performance when using the current solution, and the complexity measuring processing burden when using the current solution and the power consumption of the terminal with respect to the current solution until the QoS satisfies the condition, wherein
each controller is configured to change the parameter to provide a QoS that is closest to the condition from available changes of the parameter or to change the current solution to the alternative solution to provide a QoS that is closest to the condition from available changes of the current solution, using the feedback information; and
a multi-mode controller configured to control a standard or a mode of the sub-radio systems in the radio system group, wherein each of the sub-radio systems is further configured to select a solution according to a standard or mode determined for it by the multi-mode controller, wherein the channel state indicates an information about error and the performance is determined by a maximum cycle or an operation frequency of the radio system permitted for MIMO detection.

17. The multi-mode radio system of claim 16, wherein the condition is based on user preference or priority information with respect to the information about the channel state, the signal state, the performance when using the current solution, and the complexity measuring processing burden when using the current solution and the power consumption of the terminal with respect to the current solution.

18. The multi-mode radio system of claim 17, wherein the user preference or priority information comprises weights with respect to the channel state, the signal state, the performance when using the current solution, and the complexity measuring processing burden when using the current solution and the power consumption of the terminal with respect to the current solution.

* * * * *